(12) United States Patent
Hsu

(10) Patent No.: US 6,700,244 B2
(45) Date of Patent: Mar. 2, 2004

(54) THREE-IN-ONE STRUCTURAL COMBINATION MAGNETO MOTOR POWER SYSTEM

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 13 days.

(21) Appl. No.: 10/160,406

(22) Filed: Jun. 4, 2002

(65) Prior Publication Data

US 2003/0222532 A1 Dec. 4, 2003

(51) Int. Cl.[7] .............................. H02K 7/08; H02K 7/10; H02K 3/00
(52) U.S. Cl. .................. 310/75 R; 310/98; 310/99; 310/254; 310/68 R
(58) Field of Search ................................ 310/75 R, 89, 310/68 R, 83, 96, 98, 99, 254; 74/7 E, 7 R, 7 A; 475/149, 311

(56) References Cited

U.S. PATENT DOCUMENTS

| | | | | |
|---|---|---|---|---|
| 4,274,023 A | * | 6/1981 | Lamprey ..................... | 310/83 |
| 4,615,230 A | * | 10/1986 | Guichard ..................... | 74/427 |
| 5,976,047 A | * | 11/1999 | Woytaszek .................. | 475/149 |
| 5,998,893 A | * | 12/1999 | Fowler et al. ............ | 310/68 R |
| 6,104,112 A | * | 8/2000 | Vanjani ....................... | 310/64 |
| 6,198,182 B1 | * | 3/2001 | Bustamante et al. ...... | 310/49 R |

\* cited by examiner

*Primary Examiner*—Tran Nguyen
(74) *Attorney, Agent, or Firm*—Rosenberg, Klein & Lee (57) ABSTRACT

A 3-in-1 motor power system comprises a motor body, a drive control mechanism, and a power transmission mechanism. A drive control circuit box is installed at an end face of the motor body, and a gear housing wherein a deceleration gear module is disposed is installed at the other end face thereof. A circuit board is disposed at an end face of the motor' stator. Stator's signals are transmitted via signal conducting needles to a drive control circuit in the circuit box. A rotor's lower bearing seat is disposed at the other end face of the motor's stator. A solar gear is disposed at the tail end of the rotor's axle, and engages planetary gears of the deceleration gear module. A deceleration gear seat is separately installed at the outer end face of the rotor's lower bearing seat. The deceleration gear module is received in the deceleration gear seat.

10 Claims, 7 Drawing Sheets

FIG. 7C

THREE-IN-ONE STRUCTURAL COMBINATION MAGNETO MOTOR POWER SYSTEM

FIELD OF THE INVENTION

The present invention relates to a magneto motor power system, which reduces the complexity and inconvenience due to separate manufacturing of a motor, a drive control circuit, and a power transmission structure, solves the problem of exciting interference between the motor and the drive control circuit built therein, and improves rigidity and rotation stability of the rotor through an integral structure.

BACKGROUND OF THE INVENTION

In order to manufacture a motor power system, one must take into account rotary stability and supporting strength of the motor's rotor, separation of exciting interference between the motor and the drive control circuit, and building-in and prevention of oil leakage problem of the power transmission structure in the manufacturing process. In the disclosure of U.S. Pat. No. 6,104,112, a rotor is an outer pivot of umbrella shape. Front and rear support bearings of the rotor are disposed in a central hole of an inner stator of a motor. The outer rotor passes through the bearing with the pivot. The concentricity in the manufacturing process of the rotor structure and the stability responding to strong armature reaction of the motor are inevitably inferior. Especially, when in the situation of violent vibration (e.g., an electric vehicle), the concentricity of the rotor easily deforms to result in difficult control of rotation noise figure. Moreover, the circuit board for installing the drive control circuit and the motor's stator are simultaneously installed in the rear seat of the motor. For this kind of structure, the drive control circuit will be inevitably subject to exciting interference of armature reaction of the stator. Because the deceleration planetary gear module is exposed out of the front edge end face of the motor's body, lubrication oil of the gear module easily drains, and is easily contaminate by the environment (e.g., dust, mud, and so on), resulting in abrasion harm due to engagement between gears.

Because the motor, the drive control circuit, and the power transmission structure are separate in the prior art, the placement, installation, and operation thereof are inconvenient. The 3-in-1 drive control motor (e.g., U.S. Pat. No. 6,104,112) has the following drawbacks in structure.

1. The drive control circuit is subject to exciting interference of armature reaction of the stator.
2. The supporting strength of the umbrella-shaped rotor of the motor is insufficient, and the concentricity during rotation is hard to control, resulting in problematic rotation stability of the motor in powerful exciting rotation.
3. Because the connection procedure between the motor's stator and the drive control circuit is not smooth, the production efficiency cannot be accurate and fast.
4. Because the deceleration gear module is exposed out of the front edge end face of the motor's body, lubrication oil of the gear module easily leaks, and is easily contaminated by the environment (e.g., dust, mud, and so on), resulting in abrasion between gears.

SUMMARY OF THE INVENTION

The primary object of the present invention is to solve the problems of installation of the drive control circuit in the motor, exciting interference between the drive control circuit and the motor, insufficient supporting strength of the motor's rotor, and oil leakage of the power transmission structure. The present invention aims to provide a common-structure motor power system of high power transmission efficiency, good electric characteristic, and high rotation stability.

The various objects and advantages of the present invention will be more readily understood from the following detailed description when read in conjunction with the appended drawing, in which:

DETAILED DESCRIPTION OF THE PREFERRED EMBODIMENTS

As shown in FIGS. 1 to 7C, a 3-in-1 common-structure magneto motor power system 10 of the present invention comprises 1 motor body mechanism 21, a drive control mechanism 31, and a power transmission mechanism 41.

Figure 4:
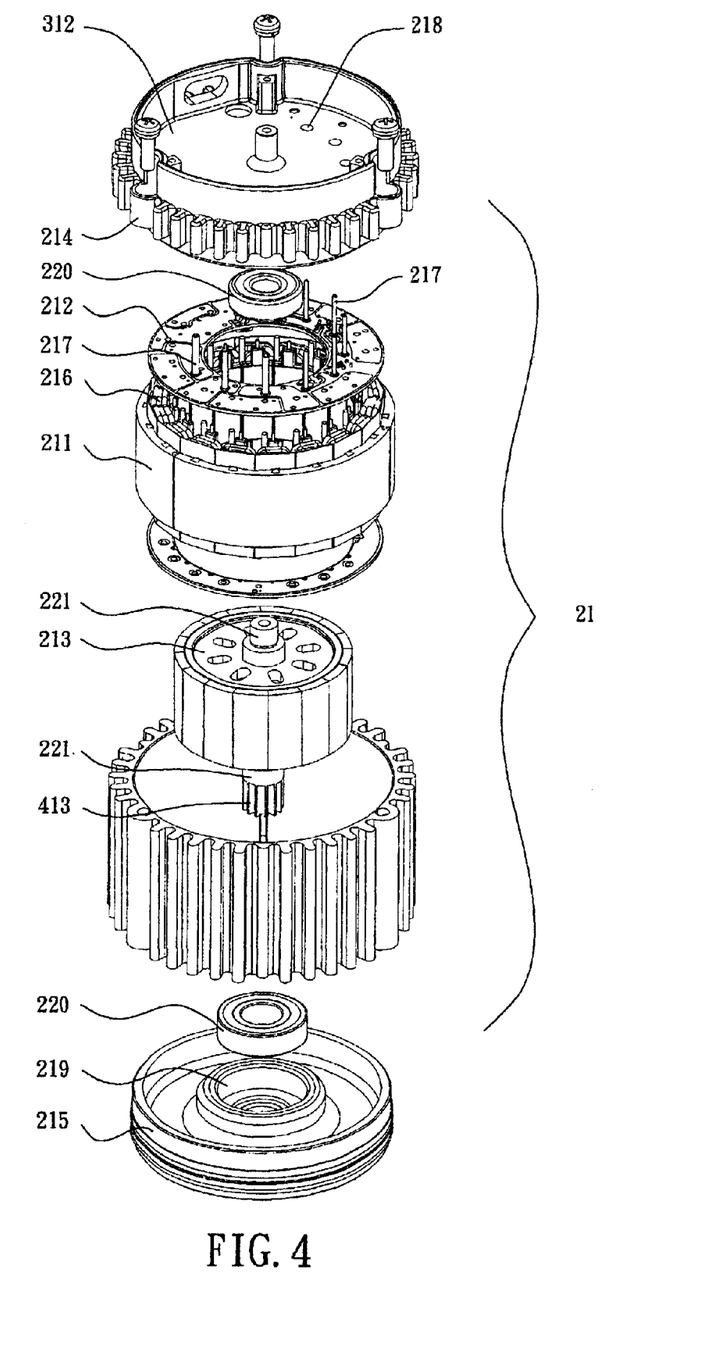
FIG. 4 is a perspective assembly view of the structure of a motor's body of the present invention.

The motor body mechanism 21 comprises a stator 211, an exciting coil connection plate 212, a rotor 213, a motor's upper cover 214, a rotor's lower bearing seat 215, and a rotor bearing 220. The exciting coil connection plate 212 is installed at the upper end face of a stator exciting coil 216. In and out signal terminals of the stator 211 are electrically connected to signal conducting needles 217 of the connection plate 212. The conducting needles 217 insulatively pass through a through hole 218 on an end face 222 of the motor's upper cover 214. The rotor's lower bearing seat 215 is disposed at the lower end face of the stator 211. A rotor's upper bearing seat 219 is disposed at the inner end of the motor's upper cover 214. The upper and lower bearing seats 219 and 215 concentrically clamp and support an axle 221 of the rotor 213 to rotate.

Figure 5:
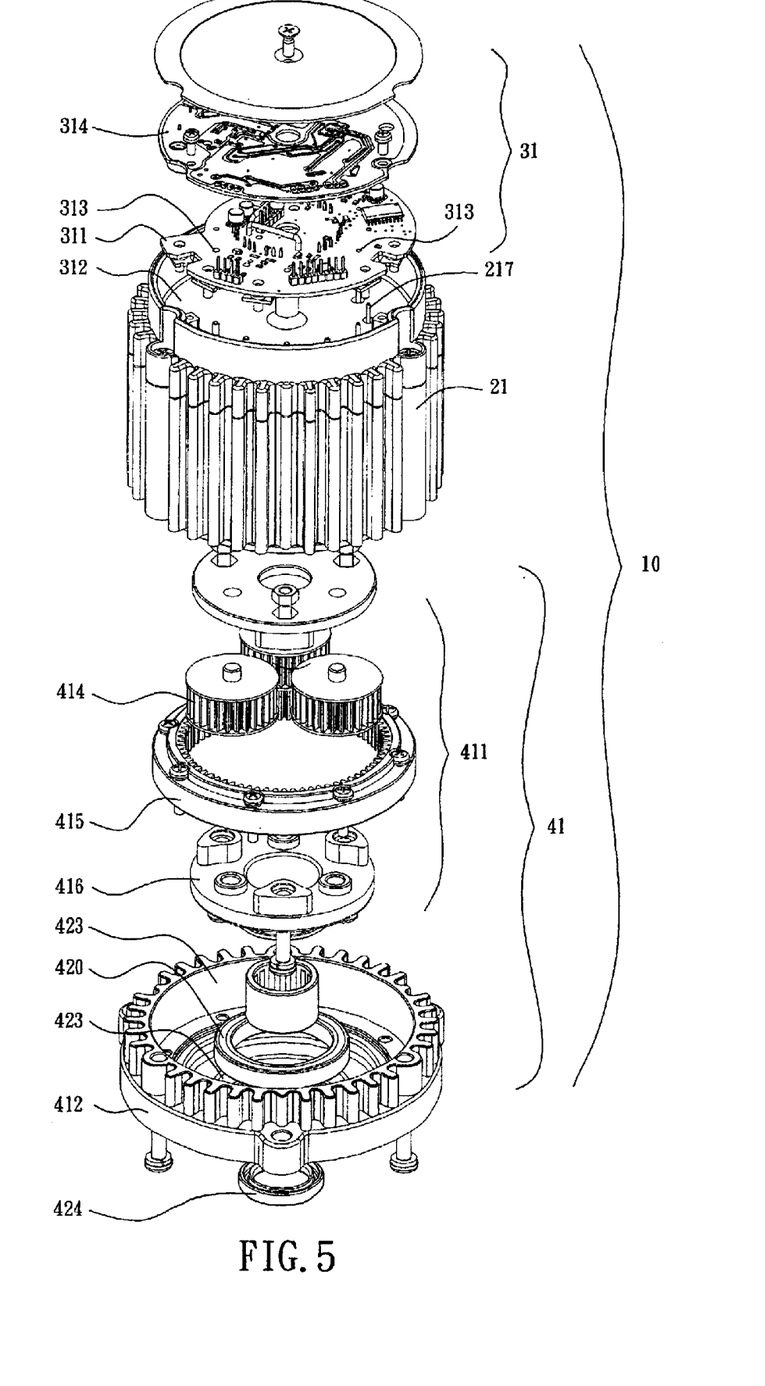
FIG. 5 is a perspective assembly view of a motor's body, a drive control mechanism, and a power transmission mechanism of the present invention.
Figure 6A:
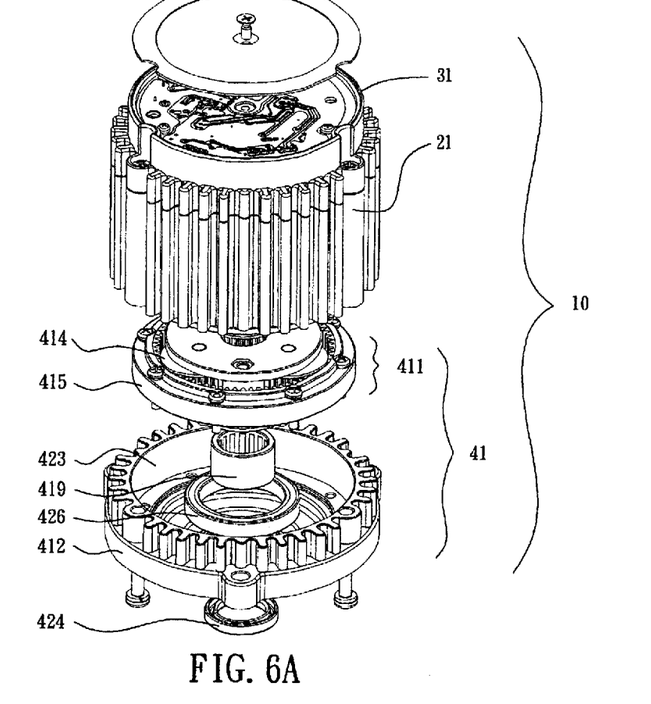
FIGS. 6A~B are perspective assembly views of assembled motor's body and drive control mechanism and a power transmission mechanism.
Figure 6B:
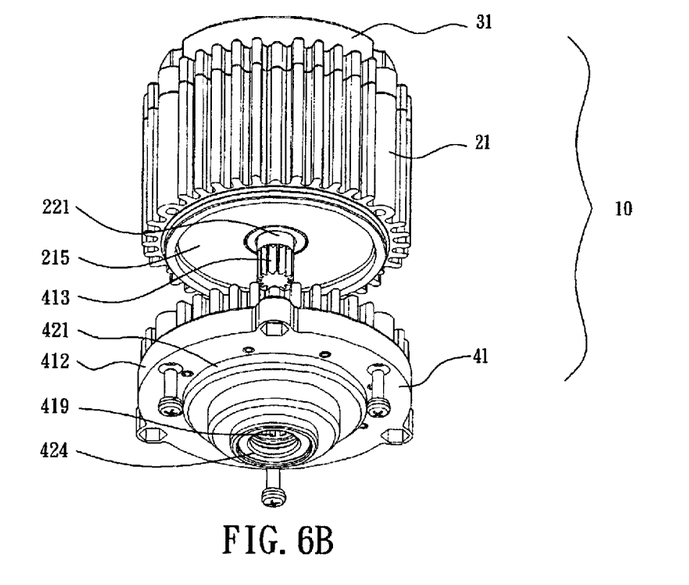
Figure 7A:
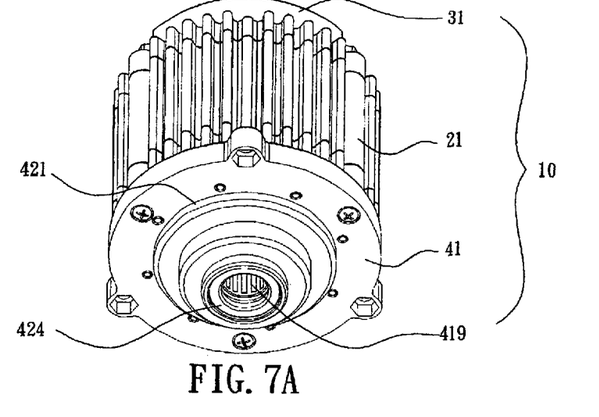
FIGS. 7A~C are perspective side views of a 3-in-1 common-structure power system according to the first, second, and third embodiments of the present inventions.
Figure 7B:
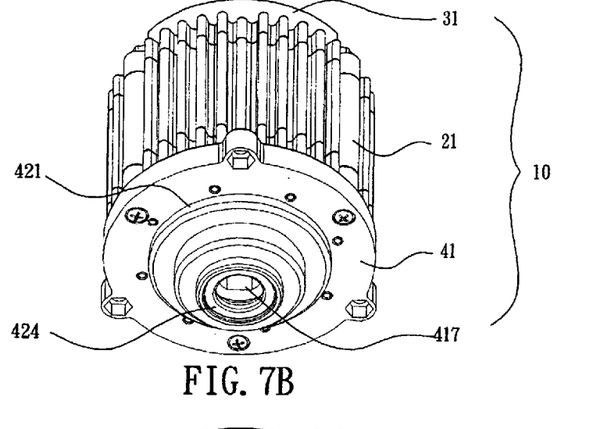
Figure 7C:
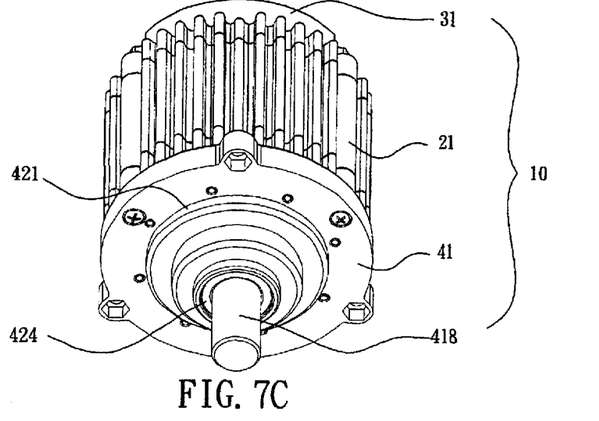

The drive control mechanism 31 comprises drive control circuits 311 and 314 and a drive control box 312. The drive control box 312 is disposed at the outer end face of the motor's upper cover 214. The drive control circuits 311 and 314 are disposed in the control box 312. The conducting needles 217 insulatively passing through the motor's upper cover are electrically connected to signal transmission ends 313 to transmit stator's signals to the drive control circuits 311 and 314 to let them directly drive the motor to rotate.

The power transmission mechanism 41 comprises a deceleration planetary gear module 411 and a gear module seat 412. The rotor axle 221 protrudes out of the outer end face of the rotor's lower bearing seat 215. A solar gear 413 is disposed at the protruding tail end of the axle 221. The solar gear 413 equiangularly engages a plurality of planetary gears 414, which then equiangularly engage inner gears 415 at the outer edge. The planetary gears 414 are also equiangularly and concentrically positioned and installed on an output end plate 416, and are used as the final torsion output end of the power transmission mechanism 41. A torsion output mounting end 417 is disposed at the center of the end plate 416. The solar gear 413, the planetary gears 414, and the inner gears 415 equiangularly engage one another to decelerate the rotation speed and enlarge the motor's torsion. The whole deceleration planetary gear module 411 is received in a recessed concentric positioning hole 421 of the gear module seat 412. The gear module seat 412 is also mounted and locked with the motor body 21 and the rotor's lower bearing seat 215.

Figure 1:
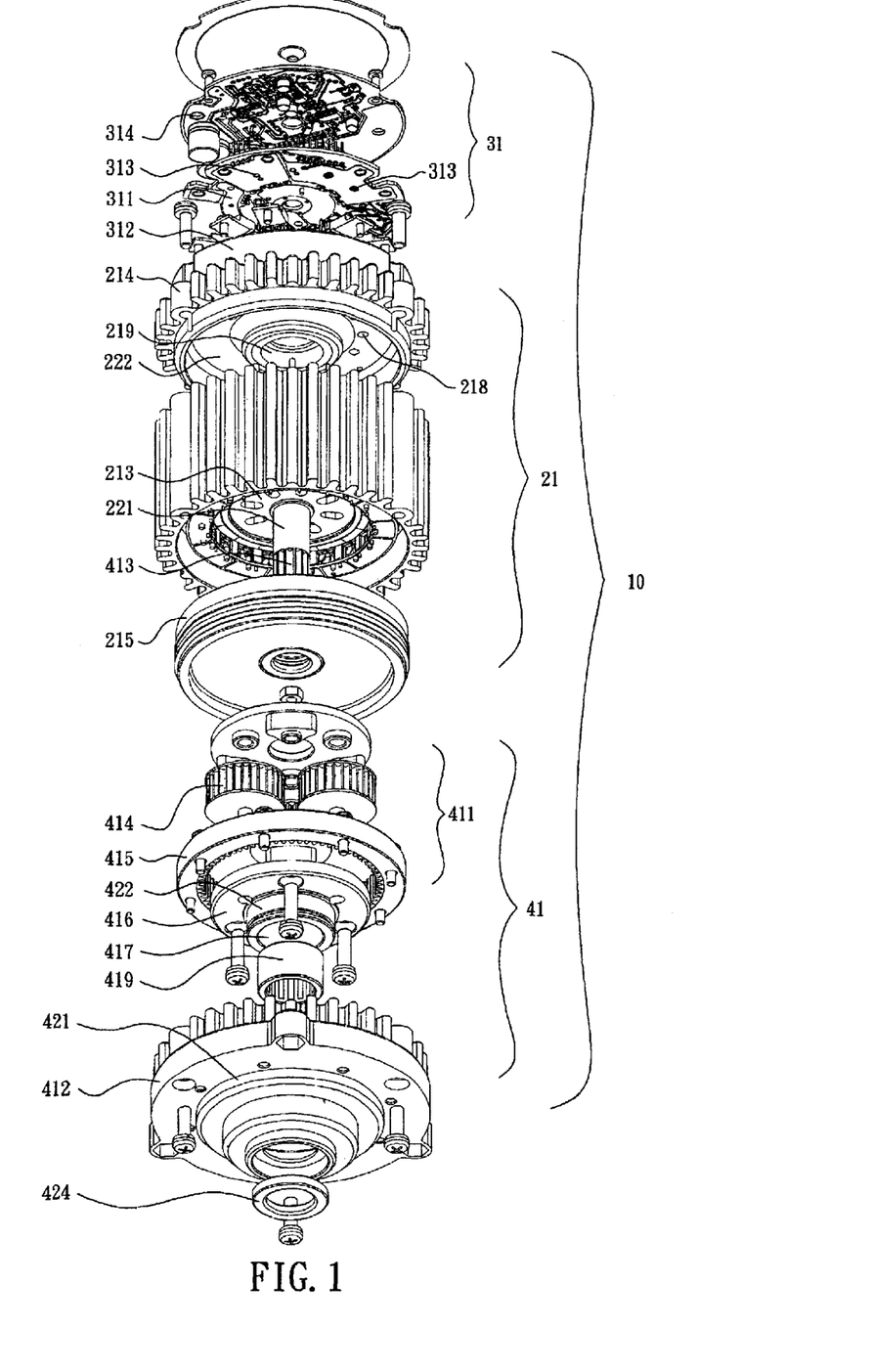
FIG. 1 is a perspective assembly view of a first embodiment of the present invention, wherein a torsion output end plate 416 of a deceleration planetary gear module comprises a unidirectional bearing 419.

The torsion output mounting end 417 comprises a tightly installed unidirectional rotation bearing 419, whose inner diameter is used as the final power output end. The unidirectional bearing 419 only provides power transmission output of unidirectional rotation for the motor. When the motor rotates in the other direction, the inner diameter of the unidirectional bearing 419 will idle and will not transmit rotation power output for the motor.

Figure 2:
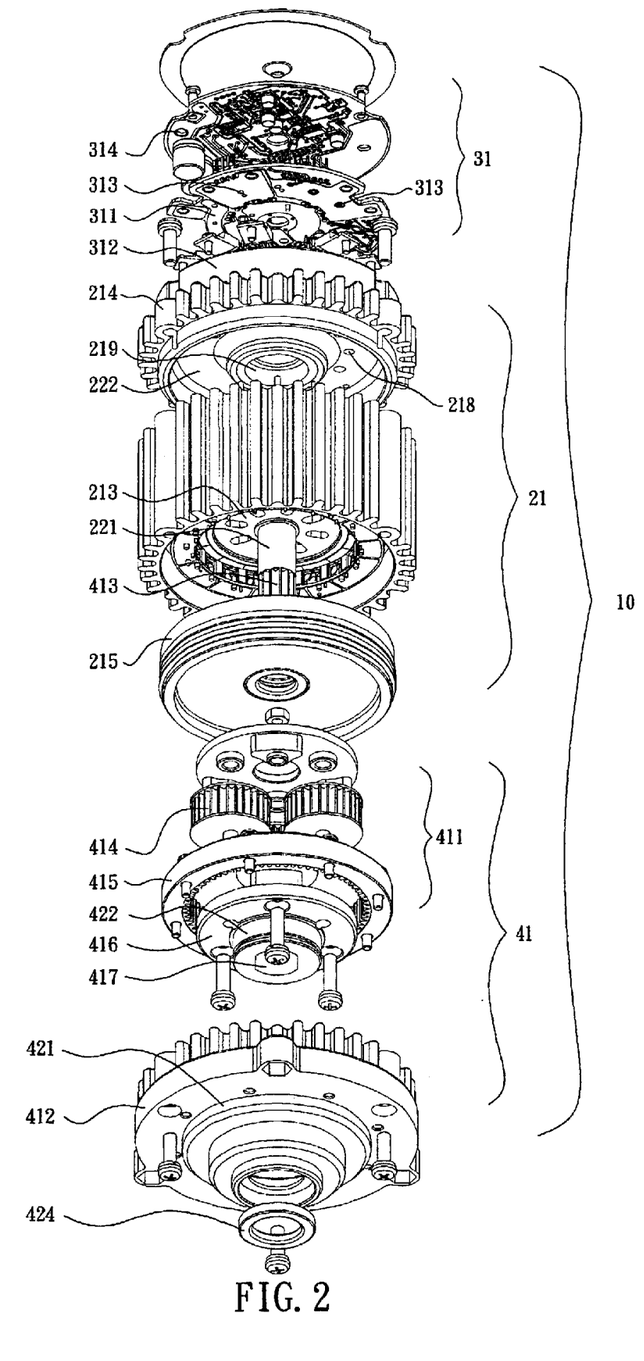
FIG. 2 is a perspective assembly view of a second embodiment of the present invention, wherein a torsion output end plate 416 of a deceleration planetary gear module comprises an output mounting end 417 of geometrical shape.

The torsion output mounting end 417 can be of geometrical shape, and is used as the final power output end.

Figure 3:
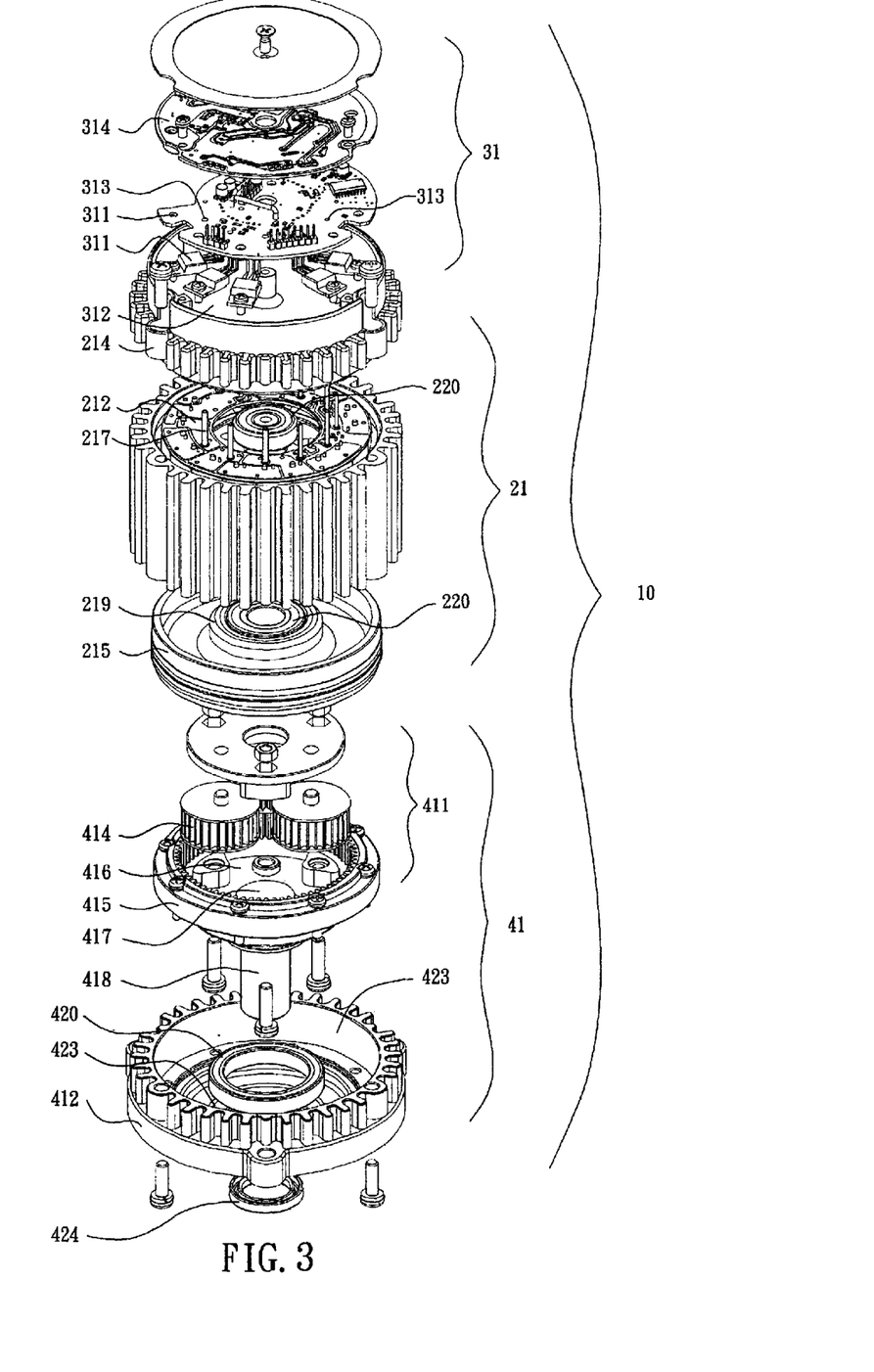
FIG. 3 is a perspective assembly view of a third embodiment of the present invention, wherein a torsion output end plate 416 of a deceleration planetary gear module comprises a mounting axle 418.

The torsion output mounting end 417 can also be of circular hole or geometrical shape. A mounting axle 418 corresponding to the circular hole or geometrical shape is provided. The torsion output mounting end 417 and the mounting axle 418 are slipped with each other to let the mounting axle 418 be used as the final power output end.

The solar gear 413 at the tail end of the rotor axle 221 can be integrally formed directly with the tail end of the axle 221.

The solar gear 413 at the tail end of the rotor axle 221 can also be separately processed and then tightly positioned at the tail end of the rotor axle 221.

The deceleration planetary gear module 411 comprises a positioning bearing 420. The inner diameter of the positioning bearing 420 passes through an output end plate positioning seat 422. The outer diameter of the positioning bearing 420 correspondingly passes through a recessed positioning hole 423 of the gear module 411.

A concentric positioning seat 421 is provided at the outside end of the gear module seat 412. The positioning seat 421 is used as a concentric mounting end of the power system 10.

The drive control circuit can be a power drive circuit 311 for directly driving the motor to rotate.

The drive control circuit can be a power drive circuit 311 and a motor rotation control circuit 314. The motor rotation control circuit 314 outputs instructions. The power drive circuit 311 drives the motor to rotate according to the instructions.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A three-in-one structural combination magneto motor power system comprising:

a motor body mechanism comprising a stator, an exciting coil connection plate, a rotor, a motor's upper cover, and a rotor's lower bearing seat, said exciting coil connection plate being installed at an upper end face of a stator exciting coil, in and out signal terminals of said stator being electrically connected to signal conducting needles of said connection plate, said conducting needles insulatively passing through a through hole at an end face of said motor's upper cover, said rotor's lower bearing seat being disposed at a lower end face of said stator, a rotor's upper bearing seat being disposed at an inner end of said motor's upper cover, said upper and lower bearing seats concentrically clamping and supporting an axle of said rotor to rotate;

a drive control mechanism comprising a drive control circuit and a drive control box, said drive control box being disposed at an outer end face of said motor's upper cover, said drive control circuit being disposed in said control box, said conducting needles transmitting stator's signals to said drive control circuit to let it directly drive a motor to rotate; and a power transmission mechanism comprising a deceleration planetary gear module and a gear module seat, said rotor axle protruding out of an outer end face of said rotor's lower bearing seat, a solar gear being disposed at the protruding tail end of said axle, said solar gear equiangularly engaging a plurality of planetary gears, said planetary gears then equiangularly engaging inner gears at the outer edge, said planetary gears being also equiangularly and concentrically positioned and installed on an output end plate and used as the final torsion output end of said power transmission mechanism, said torsion output mounting end being disposed at the center of said output end plate, said solar gear, said planetary gears, and said inner gears equiangularly engaging one another to decelerate the rotation speed and enlarge the motor's torsion, said deceleration planetary gear module being received in a recessed concentric positioning hole of said gear module seat, said gear module seat being also mounted and locked with said motor body mechanism and said rotor's lower bearing seat.

2. The 3-in-1 common-structure magneto motor power system as claimed in claim 1, wherein said torsion output mounting end comprises a tightly installed unidirectional rotation bearing, whose inner diameter is used as the final power output end; said unidirectional rotation bearing only provides power transmission output for unidirectional rotation of the motor, and the inner diameter of said unidirectional bearing will idle and will not transmit rotation power output of the motor when the motor rotates in the other direction.

3. The 3-in-1 common-structure magneto motor power system as claimed in claim 1, wherein said torsion output mounting end is not limited to any geometrical shape, and is used as a final power output end.

4. The 3-in-1 common-structure magneto motor power system as claimed in claim 1, wherein said torsion output mounting end is one of circular hole and a predermined geometrical shape, a mounting axle corresponding to said one of ciruclar hole and a predermined geometrical shape is provided, and said torsion output mounting end and said mounting axle are slipped with each other to let said mounting axle be used as a final power output end.

5. The 3-in-1 common-structure magneto motor power system as claimed in claim 1, wherein said solar gear at the tail end of said rotor axle is integrally formed with the tail end of said axle.

6. The 3-in-1 common-structure magneto motor power system as claimed in claim 1, wherein said solar gear at the tail end of said rotor axle is separately processed and then tightly positioned at the tail end of said rotor axle.

7. The 3-in-1 common-structure magneto motor power system as claimed in claim 1, wherein said deceleration planetary gear module comprises a positioning bearing, an inner diameter of said positioning bearing passes through an output end plate positioning seat, an outer diameter of said positioning bearing correspondingly passes through a recessed positioning hole of said deceleration planetary gear module.

8. The 3-in-1 common-structure magneto motor power system as claimed in claim 1, wherein a concentric positioning seat is provided at an outside end of said gear module seat, and said positioning seat is used as a concentric mounting end of said motor power system.

9. The 3-in-1 common-structure magneto motor power system as claimed in claim 1, wherein said drive control circuit is a power drive circuit for directly driving the motor to rotate.

10. The 3-in-1 common-structure magneto motor power system as claimed in claim 1, wherein said drive control circuit comprises a power drive circuit and a motor rotation control circuit, said motor rotation control circuit outputs instructions, and said and said power drive circuit drives the motor to rotate according to predetermined instructions.

* * * * *